United States Patent
Mikami et al.

(10) Patent No.: US 7,352,716 B2
(45) Date of Patent: Apr. 1, 2008

(54) WIRELESS NETWORK HAVING IEEE802.11H-INCOMPLIANT TERMINAL WIRELESS DEVICE COMMUNICATING WITH IEEE802.11H-COMPLIANT BASE WIRELESS DEVICE

(75) Inventors: Taro Mikami, Minoo (JP); Takayuki Matsui, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 385 days.

(21) Appl. No.: 11/099,452

(22) Filed: Apr. 6, 2005

(65) Prior Publication Data

US 2007/0243892 A1    Oct. 18, 2007

(30) Foreign Application Priority Data

Apr. 14, 2004    (JP) .............................. 2004-118852

(51) Int. Cl.
*H04Q 7/00* (2006.01)

(52) U.S. Cl. ...................... 370/328; 370/208; 370/250; 370/252; 370/338; 370/343; 370/348; 370/352; 370/370; 370/449; 455/450; 455/456.1

(58) Field of Classification Search ................ 370/328, 370/208, 250, 252, 332, 335, 338, 342, 343, 370/347, 348, 352, 441, 447, 442, 449; 455/522, 455/450, 453, 452.1, 456.1
See application file for complete search history.

(56) References Cited

U.S. PATENT DOCUMENTS

| | | | | |
|---|---|---|---|---|
| 7,120,138 | B2* | 10/2006 | Soomro et al. | 370/343 |
| 7,206,840 | B2* | 4/2007 | Choi et al. | 709/225 |
| 2001/0031634 | A1 | 10/2001 | Mizutani et al. | |
| 2003/0231621 | A1* | 12/2003 | Gubbi et al. | 370/352 |
| 2004/0013128 | A1* | 1/2004 | Moreton et al. | 370/447 |
| 2005/0128988 | A1* | 6/2005 | Simpson et al. | 370/338 |
| 2005/0208950 | A1* | 9/2005 | Hasse | 455/453 |
| 2006/0018284 | A1* | 1/2006 | Rudolf et al. | 370/332 |

FOREIGN PATENT DOCUMENTS

WO    WO 00/16532    3/2000

* cited by examiner

*Primary Examiner*—Matthew Anderson
*Assistant Examiner*—Shaima Q. Aminzay
(74) *Attorney, Agent, or Firm*—McDermott Will & Emery LLP

(57) ABSTRACT

In a wireless network structure which includes a wireless LAN device having a base station function (host device) which is compliant with IEEE802.11h and at least one wireless LAN device having a terminal function (slave device) which is not compliant with IEEE802.11h, the incompliant terminal transmits a probe request to the base station for confirming the presence of the base station. When the base station has dynamically switched its channel (frequency), a probe response is not returned from the base station to the terminal. Thus, the incompliant terminal transmits a probe request through a different channel in order to confirm the presence of the base station. The incompliant terminal repeats the above channel search process till the base station is found.

7 Claims, 17 Drawing Sheets

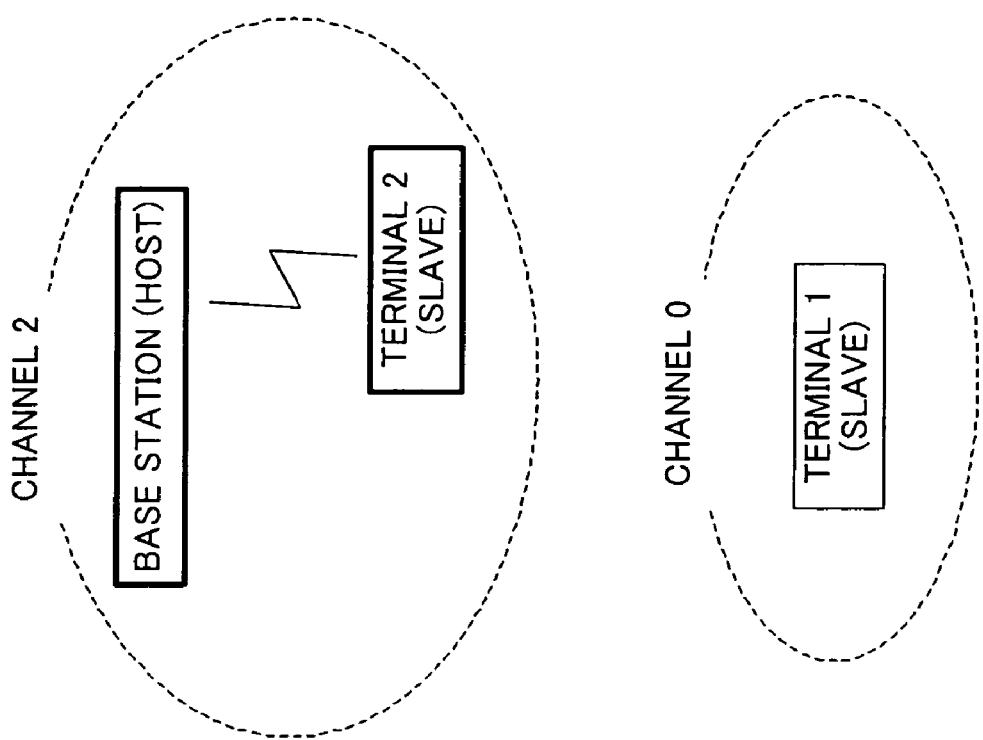
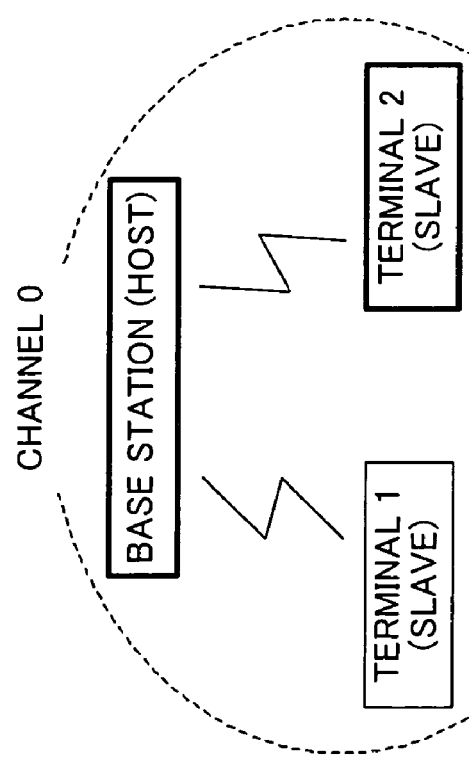

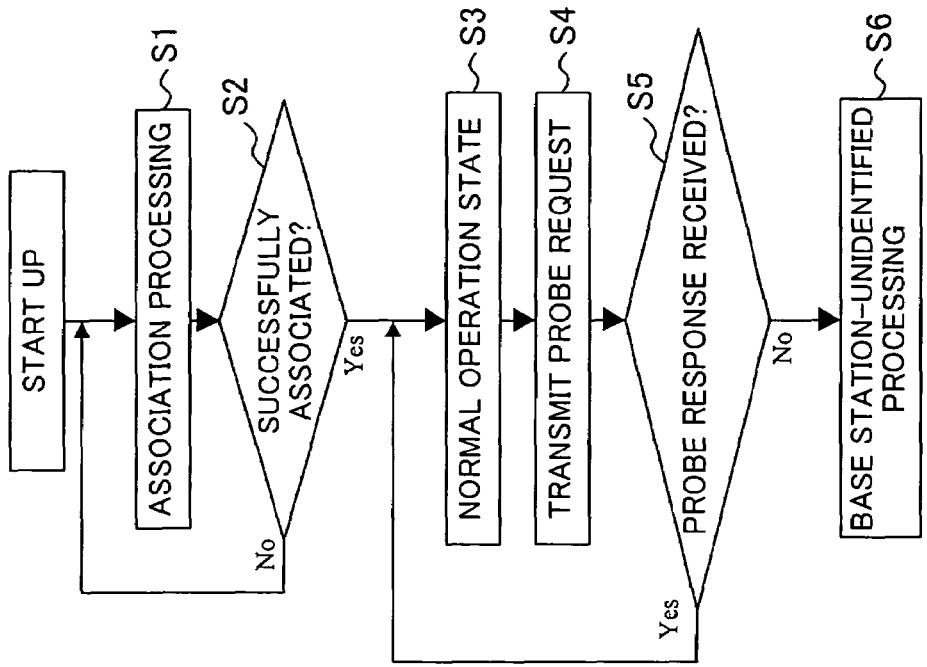
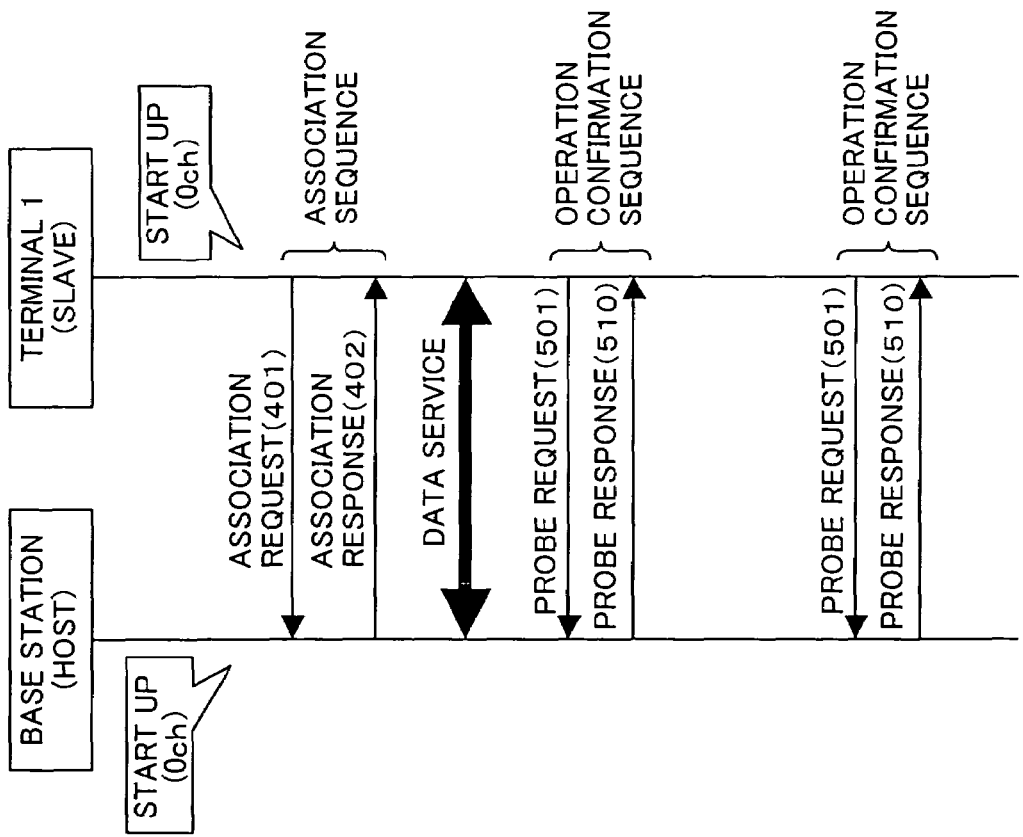

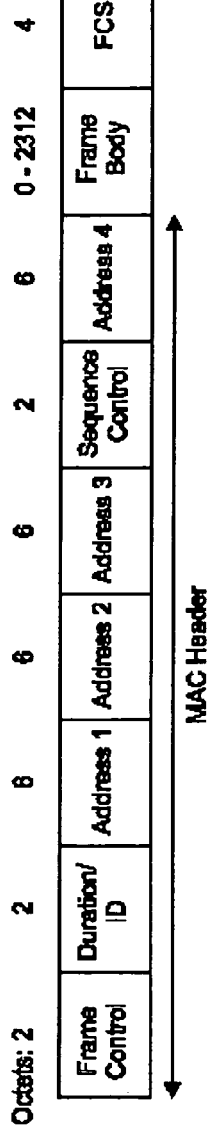
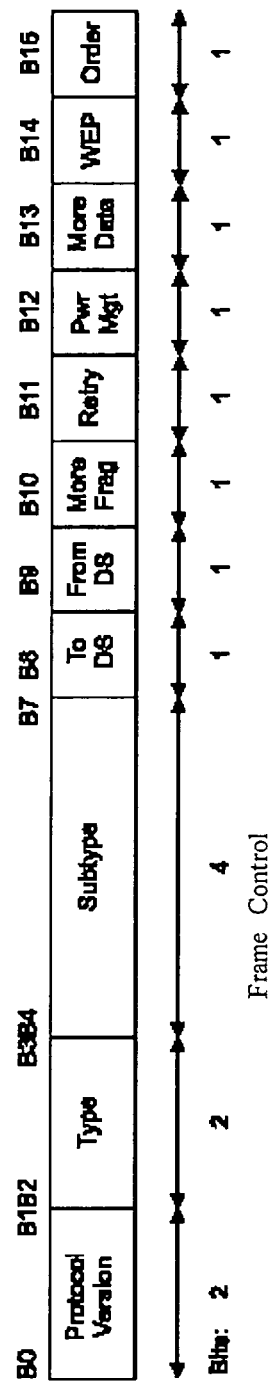
FIG. 7A
FIG. 7B
FIG. 7C

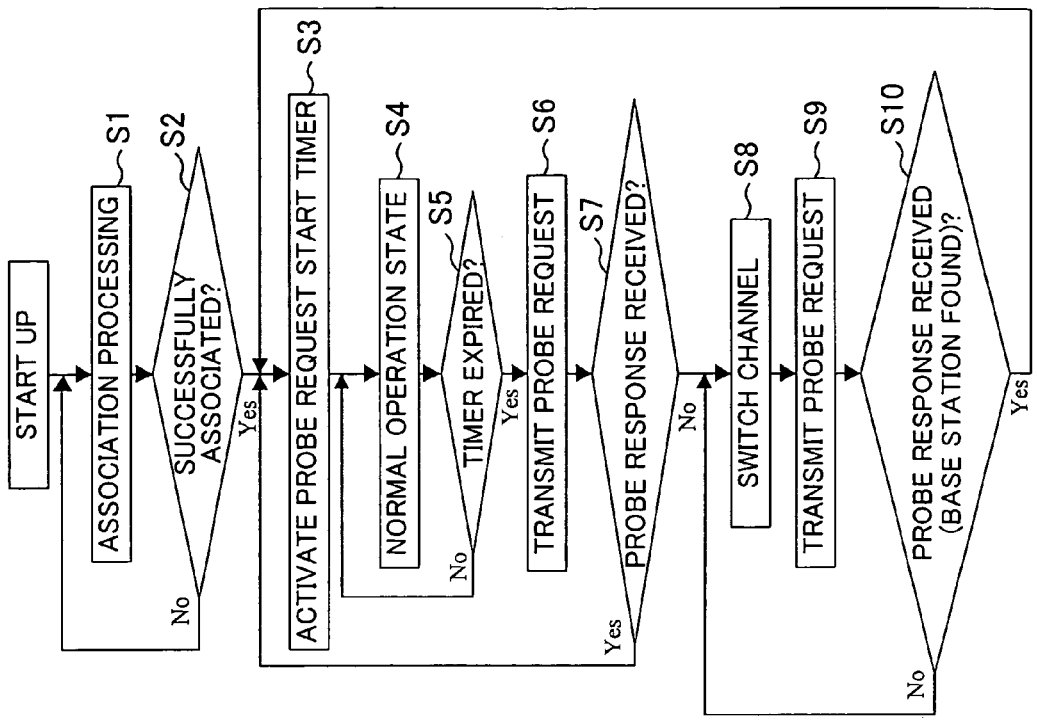
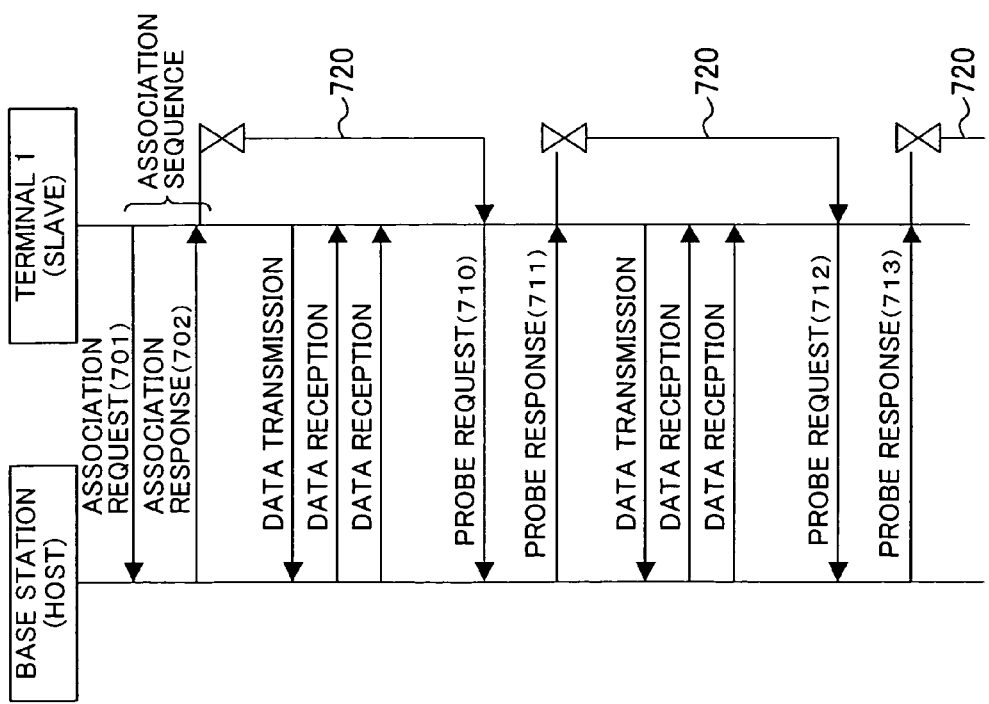

FIG. 13A
| CHANNEL NUMBER | 0 | 1 | 2 | 3 | ----- | 14 |
|---|---|---|---|---|---|---|
| STATUS | 3 | 0 | 0 | 0 | ----- | 0 |
FIG. 13B
| CHANNEL NUMBER | 0 | 1 | 2 | 3 | ----- | 14 |
|---|---|---|---|---|---|---|
| STATUS | 1 | 0 | 0 | 0 | ----- | 0 |
FIG. 13C
| CHANNEL NUMBER | 0 | 1 | 2 | 3 | ----- | 14 |
|---|---|---|---|---|---|---|
| STATUS | 1 | 1 | 0 | 0 | ----- | 0 |
FIG. 13D
| CHANNEL NUMBER | 0 | 1 | 2 | 3 | ----- | 14 |
|---|---|---|---|---|---|---|
| STATUS | 1 | 1 | 1 | 0 | ----- | 0 |
FIG. 13E
| CHANNEL NUMBER | 0 | 1 | 2 | 3 | ----- | 14 |
|---|---|---|---|---|---|---|
| STATUS | 1 | 1 | 1 | 3 | ----- | 0 |

FIG. 14A

| CHANNEL NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| CHANNEL STATUS | 0 | 0 | 0 | 0 | 0 | 0 | 0 | 0 | 0 | 0 | 0 | 0 | 0 | 0 | 0 |
| CHANNEL VACANCY INDEX | 0 | 0 | 0 | 0 | 0 | 0 | 0 | 0 | 0 | 0 | 0 | 0 | 0 | 0 | 0 |

FIG. 14B

| CHANNEL NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| CHANNEL STATUS | 0 | 0 | 0 | 0 | 2 | 0 | 0 | 0 | 0 | 0 | 0 | 0 | 0 | 0 | 0 |
| CHANNEL VACANCY INDEX | 4 | 3 | 2 | 1 | 0 | 1 | 2 | 3 | 4 | 5 | 6 | 7 | 8 | 9 | 10 |

FIG. 14C

| CHANNEL NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| CHANNEL STATUS | 0 | 0 | 0 | 0 | 2 | 0 | 0 | 0 | 0 | 0 | 0 | 0 | 0 | 0 | 2 |
| CHANNEL VACANCY INDEX | 4 | 3 | 2 | 1 | 0 | 1 | 2 | 3 | 4 | 5 | 4 | 3 | 2 | 1 | 0 |

FIG. 14D

| CHANNEL NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| CHANNEL STATUS | 0 | 0 | 0 | 0 | 2 | 0 | 0 | 0 | 0 | 1 | 0 | 0 | 0 | 0 | 2 |
| CHANNEL VACANCY INDEX | 4 | 3 | 2 | 1 | 0 | 1 | 2 | 3 | 4 | 5 | 4 | 3 | 2 | 1 | 0 |

FIG. 14E

| CHANNEL NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| CHANNEL STATUS | 2 | 0 | 0 | 0 | 2 | 0 | 0 | 0 | 0 | 1 | 0 | 0 | 0 | 0 | 2 |
| CHANNEL VACANCY INDEX | 0 | 1 | 2 | 1 | 0 | 1 | 2 | 3 | 4 | 5 | 4 | 3 | 2 | 1 | 0 |

FIG. 14F

| CHANNEL NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| CHANNEL STATUS | 2 | 0 | 0 | 0 | 2 | 0 | 0 | 0 | 2 | 1 | 0 | 0 | 0 | 0 | 2 |
| CHANNEL VACANCY INDEX | 0 | 1 | 2 | 1 | 0 | 1 | 2 | 1 | 0 | 1 | 2 | 3 | 2 | 1 | 0 |

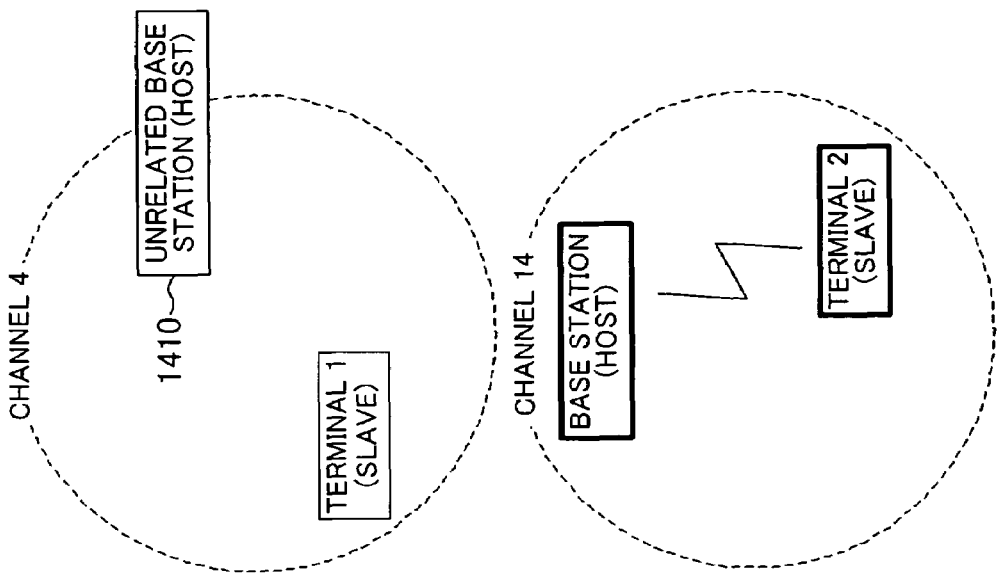
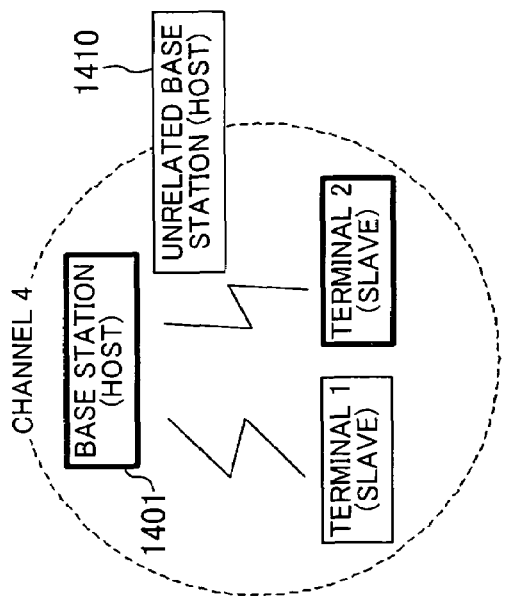
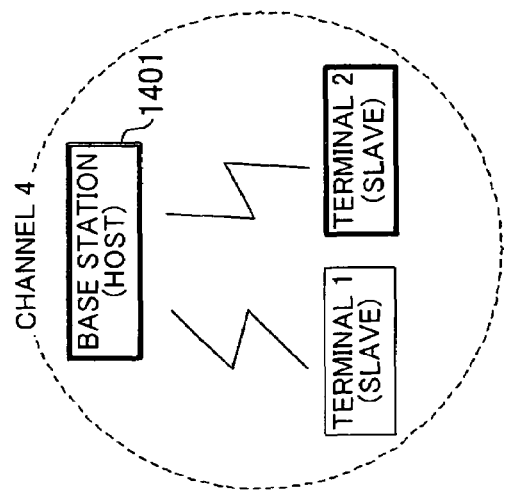

WIRELESS NETWORK HAVING IEEE802.11H-INCOMPLIANT TERMINAL WIRELESS DEVICE COMMUNICATING WITH IEEE802.11H-COMPLIANT BASE WIRELESS DEVICE

CROSS-REFERENCE TO RELATED APPLICATION

This Non-provisional application claims priority under 35 U.S.C. §119(a) on Patent Application Ser. No. 2004-118852 filed in Japan on Apr. 14, 2004, the entire contents of which are hereby incorporated by reference.

BACKGROUND OF THE INVENTION

The present invention relates to a wireless device which automatically selects a better channel when radio interference, or the like, is detected in a network which uses a wireless communication function.

In recent years, the IEEE802.11 wireless LAN system has been a wireless packet communication system standardized as a system which realizes high speed wireless data transfer. In this wireless LAN system, one base station (host device) and at least one terminal (slave device) constitute one wireless link. The wireless devices that constitute this wireless link share one wireless channel based on CSMA/CA (Carrier Sense Multiple Access with Collision Avoidance).

When the frequency band of 5 GHz is used, 4 channels are available. When the frequency band of 2.4 GHz is used, 3 channels (4 channels in some cases) are available.

In the conventional IEEE802.11 wireless LAN system, a channel designated by a user at the start up of the wireless LAN system is shared, and this channel is used to establish communications unless the user switches the channel. Thus, when the radio wave condition deteriorates in this channel, a data communication fails in some cases.

According to IEEE802.11h standard with which the above problem is solved, the channel may be automatically switched in the case of a deteriorated radio wave condition. Further, there is an obligation to immediately switch the channel when receiving a specific frequency packet (weather radar, aeronautical radio navigation, or the like).

FIG. 2 shows a communication sequence between a base station (host device) and a terminal (slave device) 2. In the example of FIG. 2, the terminal 2 is compliant with IEEE802.11h standard and, when the base station switches the channel, the terminal 2 accordingly performs a channel switch operation. In FIG. 2, the time flows vertically from top to bottom. Firstly, after the start up, both the base station and the terminal 2 operate with Channel_0. In this start-up period, the terminal 2 sends a communication of association request 301 to the base station. In response to the association request 301, the base station returns a signal of association response 302 to the terminal 2. Through the association sequence consisting of the association request 301 issued by the terminal 2 and the association response 302 issued by the base station, communication between these devices is established. Both these associated devices are provided with data services through the same channel. However, when the association condition is deteriorated, the base station searches for a channel of a better condition. For example, the base station finds a channel of a better association condition, Channel_2 (2ch), and switches the channel from Channel_0 to Channel_2. In this case, the base station sends to the terminal 2 a channel switch announcement signal 310 which notifies the terminal 2 about the switch of the channel to a new channel, Channel_2. Thereafter, the base station switches the channel to Channel_2 by itself.

FIG. 3A is a flowchart of the channel switch operation carried out by the base station of FIG. 2. FIG. 3B is a flowchart of a channel switch operation which is carried out by the terminal 2 of FIG. 2 according to the switch of channel in the base station. In the operation of the base station shown in FIG. 3A, after the start up, the base station enters the normal operation state (step S1a). Then, at step S2a, the condition of a new channel candidate is measured in order to switch the currently-selected channel to a new one in case of deterioration of the current channel. Then, at step S3a, it is determined from a result of the channel measurement at step S2a whether or not the condition of the measured new channel candidate is better than that of the current channel. If the condition of the new channel candidate is not better than that of the current channel ("No" at step S3a), the process returns to the channel measurement of step S2a, and the condition of another candidate channel is measured. This series of steps, i.e., measurement and determination, is performed on every one of all the channels till a channel whose condition is better than that of the current channel is found. If it is determined that the condition of the new channel candidate is better than that of the current channel ("No" at step S3a), the base station sends a channel switch announcement signal to the terminal 2 (step S4a) and switches the current channel to a new channel having a better condition (step S5a).

In the operation of the terminal 2 shown in FIG. 3B, after the start up, the association processing of associating with the base station is performed (step S1b). Then, it is determined whether or not the association processing has succeeded (step S2b). If the association processing has failed ("No" at step S2b), the association processing is performed again at step S1b. The series of steps S1b and S2b is repeated till the association processing succeeds. If the association processing has succeeded ("Yes" at step S2b), the terminal 2 enters the normal operation state (step S3b). After entering the normal operation state, the terminal 2 checks whether or not the channel switch announcement signal has been received in order to check whether or not the base station has switched the channel due to deterioration of the radio wave condition, i.e., whether or not the base station has sent the channel switch announcement signal to the terminal 2 at step S4a of FIG. 3A. If the switch announcement is not received ("No" at step S4b), it is determined that a communication can be established with the current channel, and the terminal 2 returns to the normal operation mode of step S3b. This check is performed at every predetermined cycle. When reception of a channel switch announcement is confirmed, the process proceeds to step S5b where the channel is switched to a new channel designated by the channel switch announcement.

In the case where both the base station and the terminal are compliant with IEEE802.11h as illustrated in FIGS. 2, 3A and 3B, the base station and the terminal are associated through Channel_0 in a start-up period, and thereafter, the base station periodically performs the channel measurement. When the radio wave condition is deteriorated, the channel switch announcement signal 310 is sent to the terminal 2, and both the base station and the terminal switch the channel used such that normal data communication is secured.

For example, PCT publication WO 00/16532 discloses a conventional technique for dynamically switching the channel (frequency) in a wireless network (hereinafter, referred to as "dynamic frequency switching technique"). According to this technique, each of the base station and the terminal performs channel measurement. The base station selects a channel having a preferable condition based on results of the measurement and notifies the terminal about the number of the selected channel, whereby dynamic frequency switching is realized.

However, in the case where a base station determines a new channel and notifies terminals about the number of the new channel to switch the current channel as in the above-described conventional dynamic frequency switching technique, a terminal which is included in the wireless network but is not compliant with IEEE802.11h standard cannot identify the channel switch announcement received from the base station. Thus, there is a possibility that this terminal cannot follow the dynamic frequency switching of the base station. This problem is described below with reference to the drawings.

FIG. 1 shows a wireless network formed by a base station (host device) and two terminals (slave devices) 1 and 2, i.e., three devices in total. In FIG. 1A, the terminal 1 and the terminal 2 are associated with the base station through Channel_0. Herein, it is assumed that the base station and the terminal 2 are compliant with IEEE802.11h standard, but the terminal 1 is not. Referring to FIG. 1B, when the base station switches the channel to Channel_2, the terminal 2 which is compliant with IEEE802.11h standard accordingly switches its channel to Channel_2 to be kept associated with the base station. However, the terminal 1, which is not compliant with IEEE802.11h standard, cannot follow the switch of the channel of the base station and remains with the former Channel_0 to be incapable of establishing communication with the base station.

FIG. 4 shows a communication sequence between the base station which is compliant with IEEE802.11h standard and the terminal 1 which is not compliant with IEEE802.11h standard.

In the example of FIG. 4, the base station and the terminal 1 operate with Channel_0 in the start-up period. The terminal 1 issues an association request 401 to the base station, and the base station sends an association response 402 in return, whereby an association is established between these devices, and the normal operation (data services) is started.

In the start-up period, the base station also establishes an association with the terminal 2 (not shown in FIG. 4) which is compliant with IEEE802.11h standard to start data services. In the case where the base station dynamically switches currently-selected Channel_0 to Channel_2 due to a change of the radio wave condition, reception of a specific frequency packet, or the like, the terminal 2 receives a channel switch announcement based on IEEE802.11h from the base station to switch its channel to be the same as that of the base station as illustrated in FIG. 1B. Specifically, as illustrated in FIG. 2, the terminal 2 receives the channel switch announcement 310 based on IEEE802.11h from the base station and switches its channel to the same one according to the announcement 310, whereby data services can be continued.

However, the terminal 1 is not compliant with IEEE802.11h and therefore cannot identify the channel switch announcement 310 based on IEEE802.11h issued from the base station. Thus, as shown in FIG. 1B, the terminal 1 remains with the former Channel_0 to be incapable of establishing communication with the base station.

SUMMARY OF THE INVENTION

An objective of the present invention is to provide a data communication technique used in a wireless network formed by, for example, a base station (host device) which is compliant with IEEE802.11h and a terminal (slave device) which is not compliant with IEEE802.11h wherein even when the base station switches its channel, the incompliant terminal appropriately switches its channel to be the same as that of the base station to continue data communication although the incompliant terminal does not have a dynamic frequency switching function.

In order to achieve the above objective, a wireless device of the present invention is an IEEE802.11h-incompliant terminal (slave device) which is associated with an IEEE802.11h-compliant base station (host device) and has no dynamic frequency switching function. However, the terminal of the present invention transmits a probe request of IEEE802.11 standard, which is the higher-level common standard of IEEE802.11h, to the base station and receives a probe response which is common under IEEE802.11 standard and IEEE802.11h standard in return, thereby confirming that the base station is in operation (exists in the same channel presently selected).

Further, when a response is not received from the base station within a predetermined period, the IEEE802.11h-incompliant terminal sequentially searches the channels other than the presently-selected channel (frequency) to again establish an association with the base station moved to a different channel.

A wireless device of the present invention is a wireless device which has a terminal function compliant with IEEE802.11 standard but incompliant with IEEE802.11h standard, the wireless device being included in a wireless network formed by a wireless device having a base station function compliant with IEEE802.11h standard and at least one wireless device having a terminal function compliant with IEEE802.11 standard, the terminal wireless device comprising: a probe request transmission circuit for transmitting a probe request to the base station wireless device, the probe request being used for confirming whether or not the base station wireless device and the incompliant terminal wireless device of the same wireless network exist in the same channel; and a base station presence confirmation circuit for receiving a probe response which is transmitted from the base station wireless device in response to the probe request transmitted by the probe request transmission circuit, thereby confirming the presence of the base station wireless device.

In one embodiment of the wireless device of the present invention, the probe request transmission circuit has a probe confirmation timer for measuring a time interval for transmission of the probe request.

In one embodiment of the wireless device of the present invention, the probe request transmission circuit has a data reception status confirmation timer; during a period when the incompliant terminal wireless device receives data from the base station wireless device, the data reception status confirmation timer is reset and stopped; and when reception of the data from the base station wireless device is stopped, the data reception status confirmation timer measures a preset time.

In one embodiment of the wireless device of the present invention, the timer function of the data reception status confirmation timer is realized in the form of driver software.

In one embodiment of the wireless device of the present invention, the timer function of the data reception status confirmation timer is realized by hardware.

In one embodiment of the wireless device of the present invention, when the base station presence confirmation circuit receives no probe response from the base station wireless device, the base station presence confirmation circuit repeats the process of switching the channel and transmitting the probe request through the switched channel till the base station presence confirmation circuit receives the probe response.

In one embodiment of the wireless device of the present invention, the probe request transmission circuit switches the channel using a channel search algorithm such that a channel which is furthest from a channel including a base station wireless device of a different wireless network is searched by priority.

According to the present invention, when a terminal incompliant with IEEE802.11h, i.e., a terminal not having a dynamic frequency switching function, is used in a wireless network formed by IEEE802.11h-compliant devices that have a dynamic frequency switching function as an extended standard, the IEEE802.11h-incompliant terminal transmits a probe request of IEEE802.11 standard to the base station and confirms whether or not the base station exists in the same channel according to whether or not a probe response of IEEE802.11 standard is received. Thus, even if the terminal is not compliant with IEEE802.11h standard, the terminal can confirm the presence of the base station.

According to the present invention, the terminal includes the probe confirmation timer. Therefore, the time interval for transmission of the probe request for confirmation of the presence of the base station can be set arbitrarily.

According to the present invention, the timer for setting the time interval for transmission of the probe request for confirmation of the presence of the base station is reset and stopped during reception of data sent from the base station. Thus, the time interval for transmission of the probe request can be efficiently set.

According to the present invention, the data reception status confirmation timer is provided inside as driver software. Thus, a reception timer function can readily be added.

According to the present invention, the data reception status confirmation timer is provided in the form of hardware. Thus, the process burden on the host device is reduced, and the delay time from notification of reception can be shortened.

According to the present invention, a channel which is distant from a channel including a base station of a different network is searched by priority. Thus, it is possible to efficiently find the base station which has switched the channel because of deterioration in the radio wave condition due to interference, or the like.

BRIEF DESCRIPTION OF THE DRAWINGS

FIG. 1A shows a wireless network including a base station and terminals 1 and 2 in Channel_0. FIG. 1B shows the wireless network wherein the base station and the terminal 2 are associated through Channel_2, whereas the terminal 1 remains with Channel_0.

FIG. 5A shows a communication sequence between the base station and the terminal 1 which is not compliant with IEEE802.11h. FIG. 5B is a flowchart of an operation of the terminal 1 which is not compliant with IEEE802.11h.

FIG. 7A shows a MAC frame format. FIG. 7B shows a format of MAC frame control. FIG. 7C shows the type of MAC frames.

FIG. 8A shows a communication sequence without quality of service (QOS) between the base station and the terminal 1 incompliant with IEEE802.11h. FIG. 8B is a flowchart of an operation without quality of service (QOS) of the terminal 1 incompliant with IEEE802.11h.

FIG. 13A illustrates an example of channel search according to embodiment 4 of the present invention, wherein the related base station is associated with Channel_0. FIG. 13B illustrates an example of channel search wherein no response is issued to Channel_0. FIG. 13C illustrates an example of channel search wherein no response is issued to Channel_0 and Channel_1. FIG. 13D illustrates an example of channel search wherein no response is issued to Channel_0, Channel_1 and Channel_2. FIG. 13E illustrates an example of channel search wherein no response is issued to Channel_0, Channel_1 and Channel_2, and the related base station is found in Channel_3.

FIG. 14A shows the initial state of a channel information table in a channel search example according to embodiment 5 of the present invention. FIG. 14B shows the channel information table wherein an unrelated base station is found in Channel_4. FIG. 14C shows the channel information table wherein an unrelated base station is found in Channel_14 under the state of FIG. 14B. FIG. 14D shows the channel information table wherein it is confirmed that Channel_9 is vacant under the state of FIG. 14C. FIG. 14E shows the channel information table wherein an unrelated base station is found in Channel_0 under the state of FIG. 14D. FIG. 14F shows the channel information table wherein an unrelated base station is found in Channel_8 under the state of FIG. 14E.

FIG. 16 illustrates an example of the channel search algorithm and sequential search according to embodiment 5 of the present invention.

DESCRIPTION OF THE PREFERRED EMBODIMENTS

Figure 2:
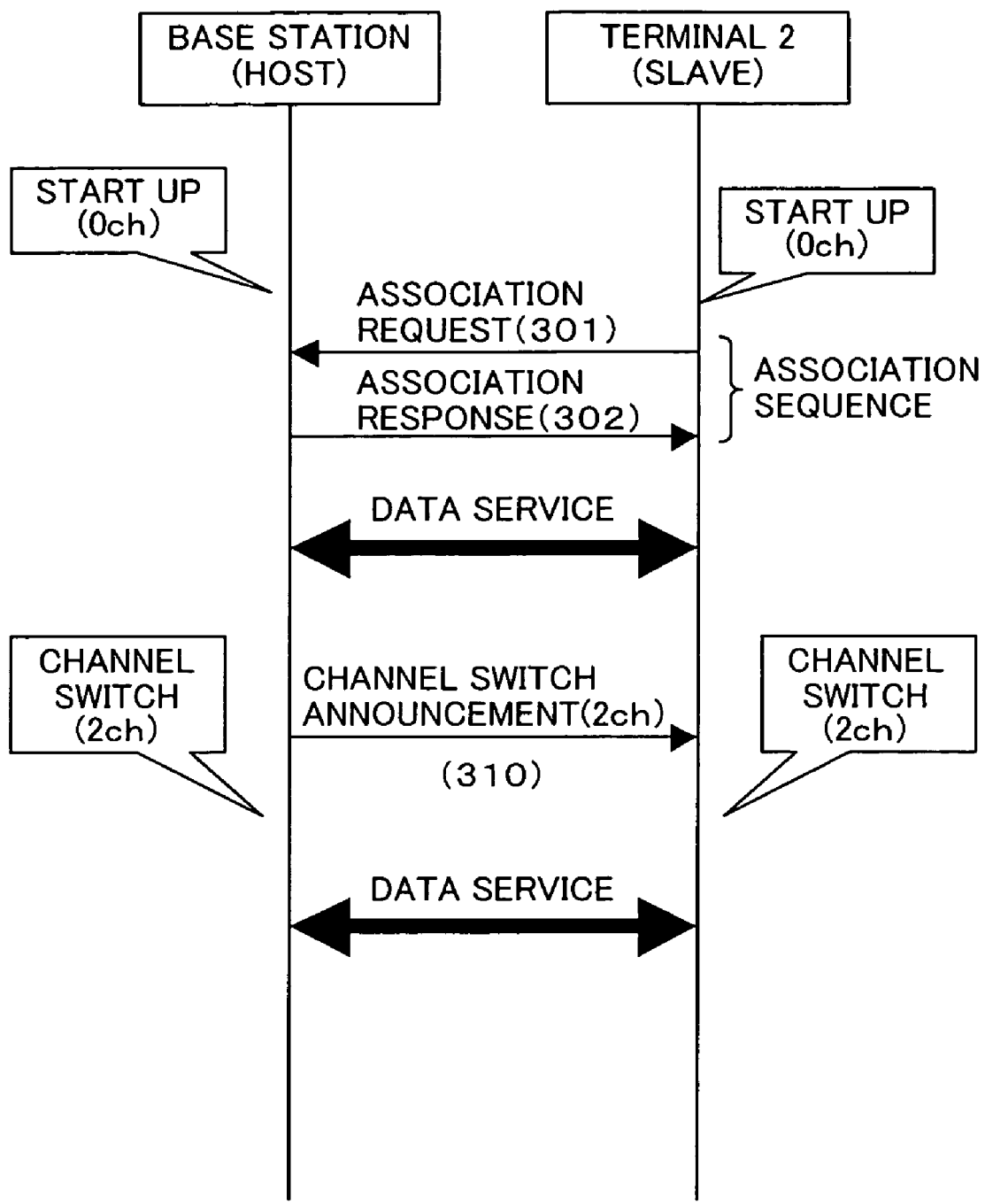
FIG. 2 shows a communication sequence between the base station and the terminal 2, both of which are compliant with IEEE802.11h.
Figure 3B:
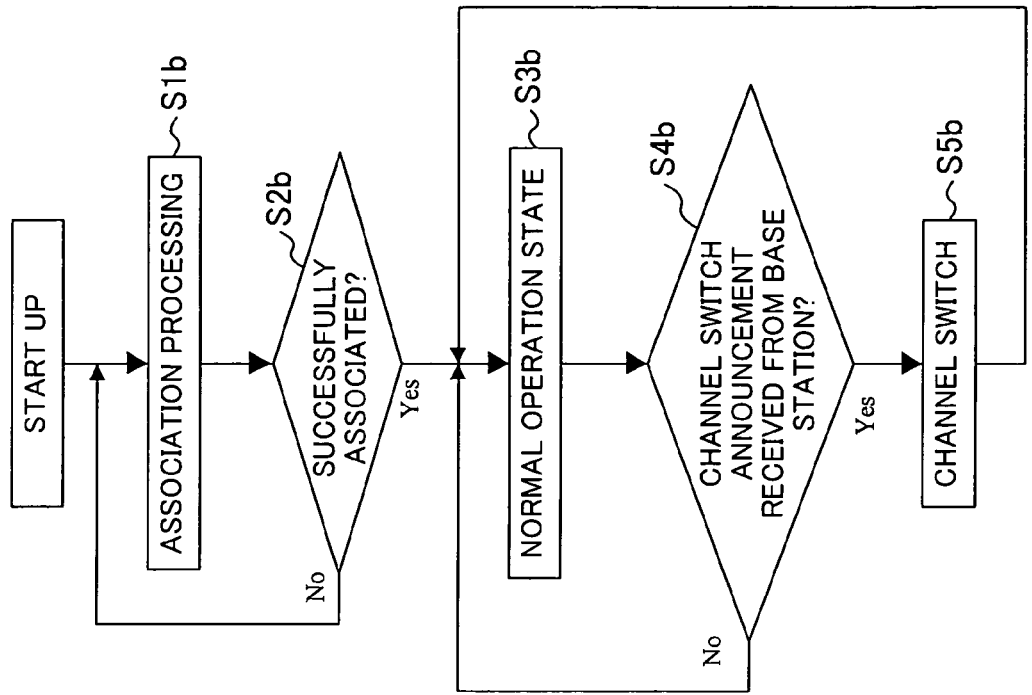
FIG. 3B is a flowchart of an operation of an IEEE802.11h-compliant terminal.
Figure 3A:
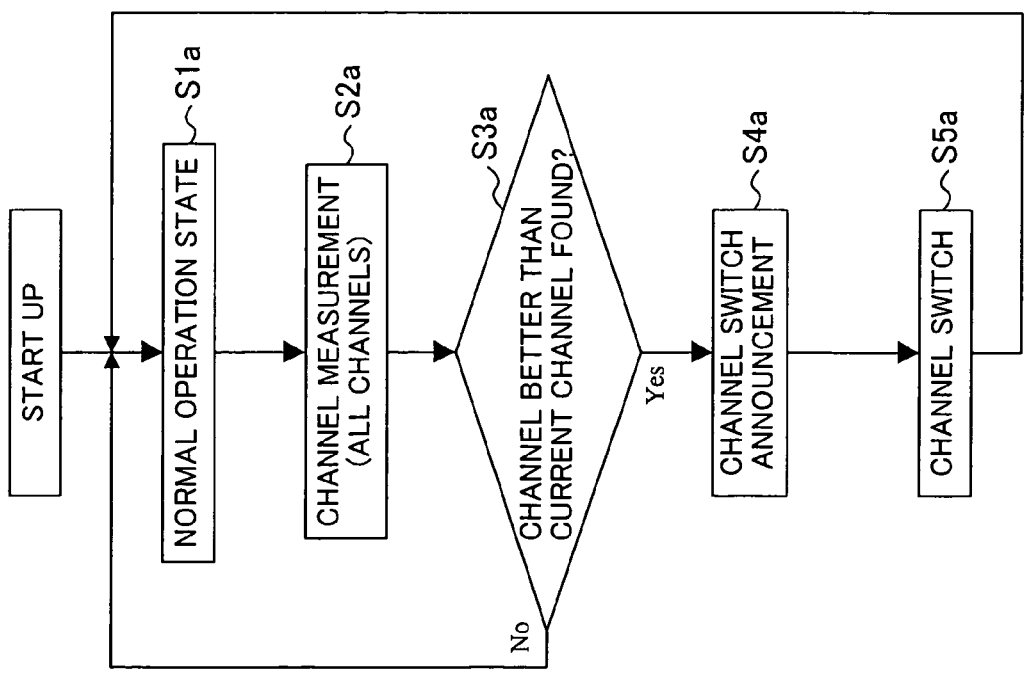
FIG. 3A is a flowchart of an operation of an IEEE802.11h-compliant base station.
Figure 4:
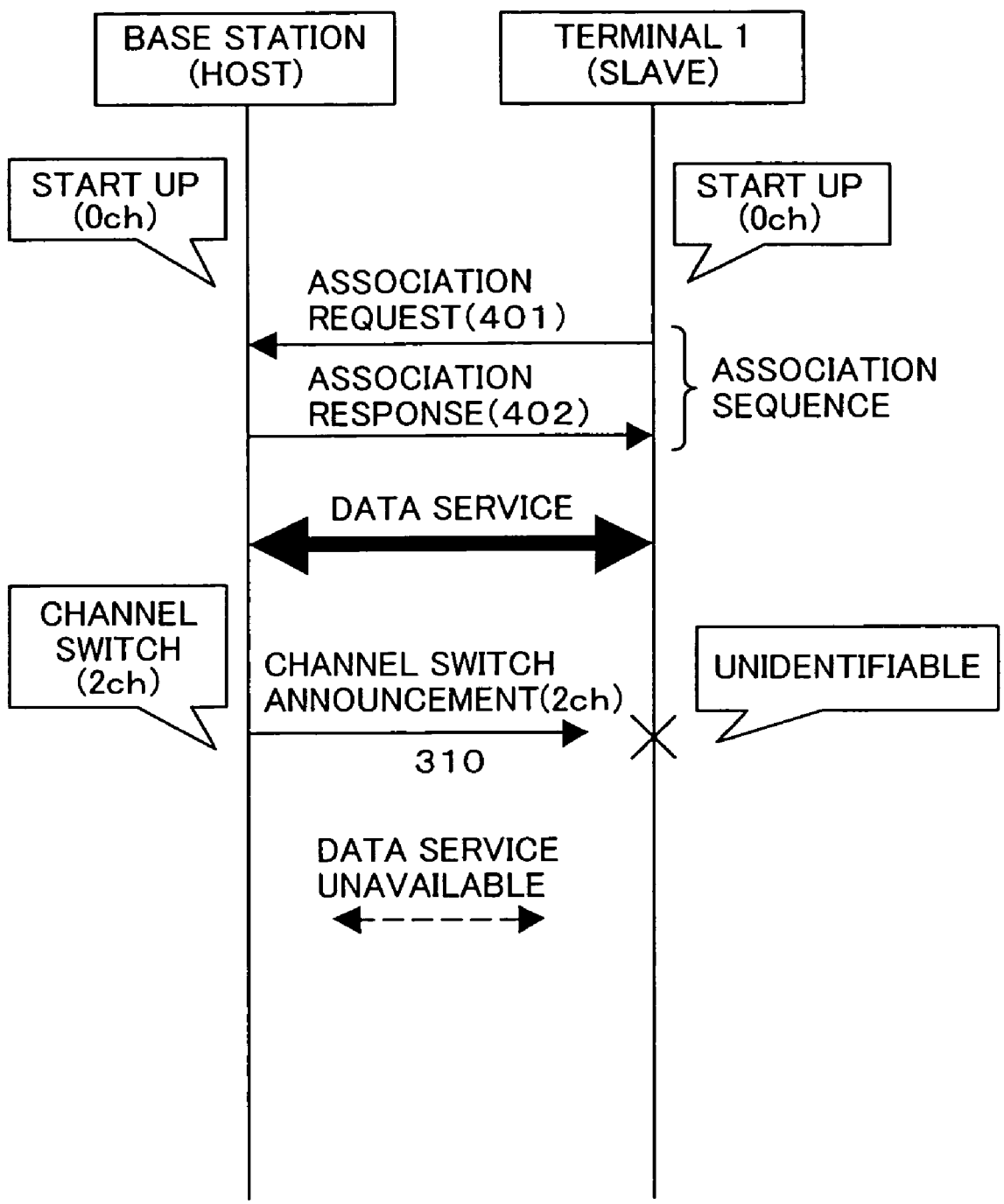
FIG. 4 shows a communication sequence between the IEEE802.11h-compliant base station and the terminal 1 which is not compliant with IEEE802.11h.

Hereinafter, preferred embodiments of the present invention are described with reference to the attached drawings.

Embodiment 1

FIG. 1A shows a wireless network formed by a base station and two terminals, i.e., three devices in total, through Channel_0. In embodiment 1, the base station and the terminal 2 are compliant with IEEE802.11h standard, i.e., have a dynamic frequency switching function, which is an extended standard of IEEE802.11. The terminal 1 is compliant with IEEE802.11 standard but not compliant with IEEE802.11h standard. Hereinafter, a terminal which is not compliant with IEEE802.11h is simply referred to as "incompliant terminal".

FIG. 5A shows association and operation confirmation sequences between the IEEE802.11h-compliant base station and the incompliant terminal 1 shown in FIG. 1.

In the example of FIG. 5A, both the base station and the terminal 1 exist in Channel_0 in the start-up period. In this chart, the time flows downward. After the start up, the terminal 1 transmits an association request signal 401 to the base station, and the base station transmits an association response signal 402 to the terminal 1 in return, whereby a wireless communication link is established between these devices. With this link, a normal operation (data services) is started. After the start of the normal operation, the terminal 1 (probe request transmission circuit) transmits a probe request 501 to the base station in order to confirm whether or not the terminal 1 is associated with the base station. Then, the terminal 1 receives a probe response 510 from the base station as a response to the probe request 501 to confirm that the base station exists in the same channel (base station existence confirmation circuit). This operation confirmation sequence is performed with predetermined intervals.

FIG. 5B is a flowchart of an operation of a terminal incompliant with IEEE802.11h standard.

After the start up, the incompliant terminal 1 performs predetermined association processing, thereby attempting to establish an association with the base station (step S1).

The incompliant terminal 1 determines whether or not an association has been successfully established as a result of the association processing at step S1 (step S2). If successful ("Yes" at step S2), the terminal 1 enters the normal operation state of step S3. If failed ("No" at step S2), the operation returns to the association processing of step S1.

After the start of the normal operation of step S3, the terminal 1 transmits a probe request to the base station to confirm whether or not the terminal 1 and the base station exist in the same channel (step S4).

The terminal 1 determines whether or not the terminal 1 has received from the base station a probe response issued in response to the probe request of the terminal 1 at step S4 (step S5). If the terminal 1 has received the probe response from the base station ("Yes" at step S5), it is determined that the terminal 1 and the base station exist in the same channel and, therefore, a communication can be established therebetween. The terminal 1 then returns to the normal operation state of step S3. The operation confirmation processing of steps S3 to S5 is repeated with predetermined intervals so long as the terminal 1 and the base station exist in the same channel. If the terminal 1 has received no probe response from the base station ("No" at step S5), it is determined that the terminal 1 and the base station do not exist in the same channel, and the operation proceeds to the base station-unidentified processing of step S6. The base station-unidentified processing includes an update of link information retained in the terminal 1, notification to the user about the absence of a base station, etc.

Figure 6:
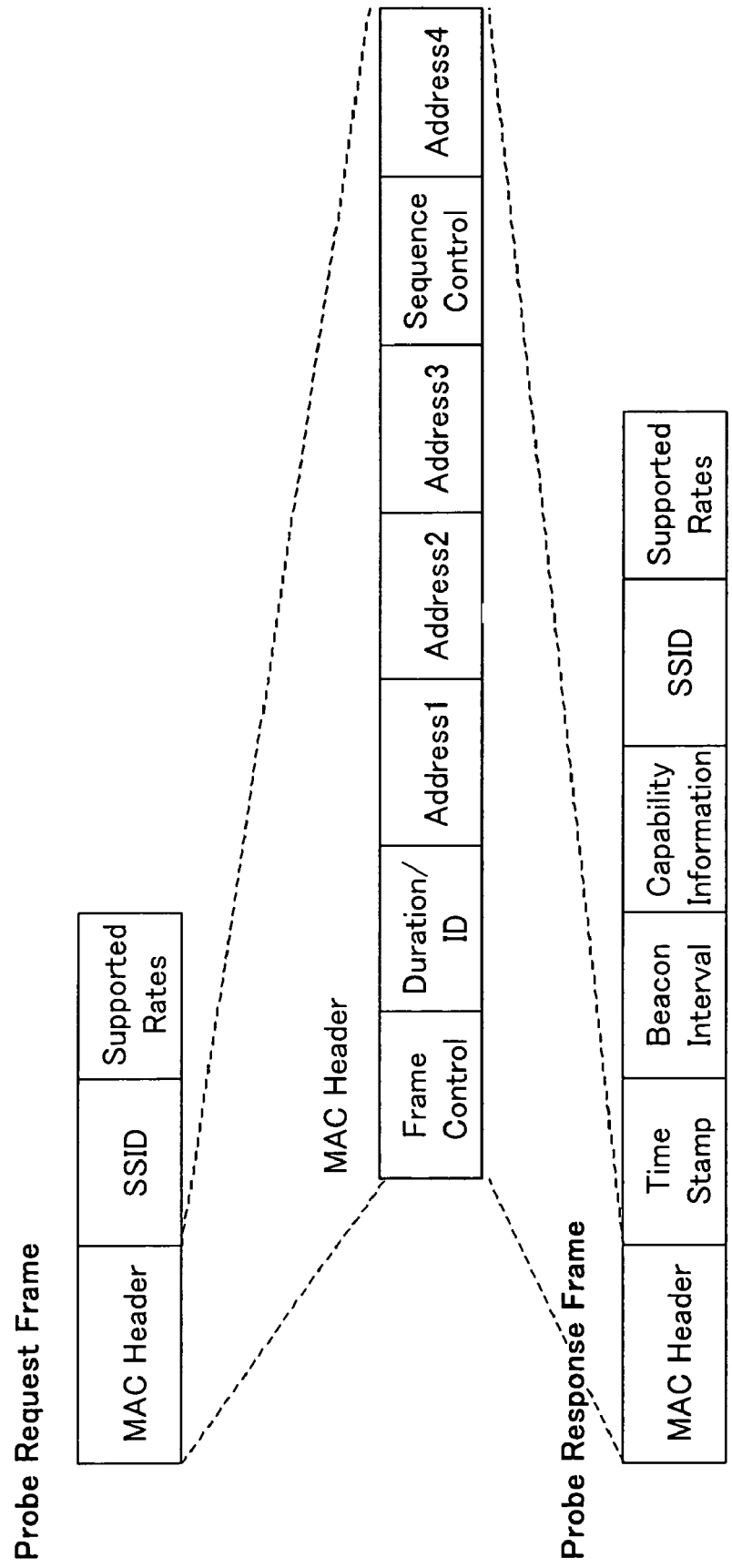
FIG. 6 shows a format of a probe request.

FIG. 6 shows a format of the probe request transmitted by the incompliant terminal 1 of embodiment 1 and a format of the probe response transmitted by the base station. The formats of the packets shown herein are formats used by communication devices compliant with IEEE802.11 standard.

FIG. 7A shows a frame format of IEEE802.11 MAC. FIG. 7B shows an enlarged view of the Frame Control section at leading two octets of the frame format of IEEE802.11 MAC. FIG. 7C shows IEEE802.11 MAC frame type. The IEEE802.11 MAC frame type shown in FIG. 7C can be determined from the values of Type field and Subtype field included in the MAC header. For example, if the type value is 00 and the subtype value is 0100, it is a probe request. The incompliant terminal 1 transmits the probe request to the base station. When receiving a probe response from the base station in return, the terminal 1 confirms that the terminal 1 and the base station exist in the same channel.

Embodiment 2

FIG. 8A shows a communication sequence without quality of service (QOS) between the base station and the terminal 1 incompliant with IEEE802.11h according to embodiment 2 of the present invention. In the example of FIG. 8A, in the first place, an association sequence which is the same as that described in embodiment 1 is carried out. Specifically, the incompliant terminal 1 transmits an association request 701 to the base station and receives an association response 702 from the base station in return, whereby a wireless link is established between these devices. In the incompliant terminal 1, new link information about the link with the base station is created in link information 700 which is managed inside the incompliant terminal 1.

After the establishment of the link by reception of the association response 702, the incompliant terminal 1 activates a probe request start timer (probe confirmation timer) 720 with which the confirmation interval for confirming the presence of a base station in the same channel is set. Then, the timer 720 expires at the end of a predetermined time period, and the terminal 1 transmits a probe request 710. Receiving a probe response 711 from the base station in return, the terminal 1 confirms that the terminal 1 and the base station exist in the same channel and accordingly activates the probe request start timer 720 again.

With the above structure, the incompliant terminal 1 can confirm whether or not the base station and the terminal 1 exist in the same channel with arbitrary time intervals which is set in the timer of the incompliant terminal 1. FIG. 8B is a flowchart of an operation of the incompliant terminal 1.

Referring to FIG. 8B, after the start up, the terminal 1 incompliant with IEEE802.11h performs association processing to transmit the association request 701 shown in FIG. 8A to the base station, thereby attempting to establish an association with the base station (step S1). The terminal 1 determines whether or not an association has been successfully established as a result of the association processing at step S1 (step S2). If successful ("Yes" at step S2), the terminal 1 activates the probe request start timer 720 at step S3 and enters the normal operation state of step S4. If failed ("No" at step S2), the operation returns to the association processing of step S1.

After the start of the normal operation of step S4, the terminal 1 determines whether or not the timer 720 has expired (step S5). The normal operation of step S4 is continued until expiration of the timer 720. After the expiration of the timer 720, the terminal 1 transmits the probe request 710 to the base station (step S6). Then, it is determined whether or not the terminal 1 has received the probe response 711 from the base station in return (step S7). If received ("Yes" at step S7), it is determined that the terminal 1 is in association with the base station, and then, the terminal 1 activates the probe request start timer 720 again (step S3).

If the probe response 711 has not been received ("No" at step S7), it is determined that the base station has moved to another channel, and the terminal 1 switches its channel (step S8). Then, the terminal 1 sends the probe request 710 to confirm whether or not the base station exists in the switched channel (step S9). Then, it is determined whether or not the terminal 1 has received the probe response 711 from the base station in response to the probe request 710, i.e., whether or not the base station has been found (step S10). If the base station has been found ("Yes" at step S10), the terminal 1 enters the normal operation state where the terminal 1 can carry out transmission and reception of data. Then, the operation returns to step S3 as it does at step S7 when the probe response 711 has been received. At step S3, the probe request start timer 720 is activated. If the base station has not been found ("No" at step S10), the operation returns to step S8. At step S8, the channel is switched again, and thereafter, the process of steps S8 to S10 is repeated till the base station is found.

Embodiment 3

Figure 9B:
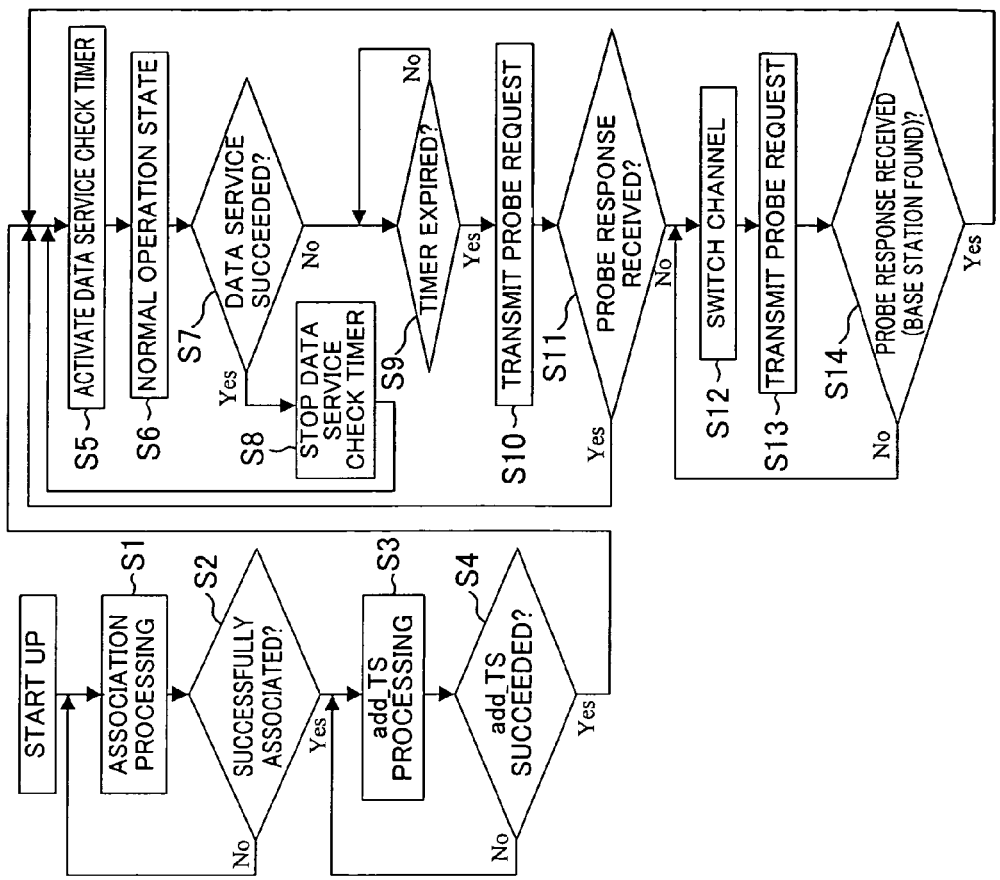
FIG. 9B is a flowchart of an operation with quality of service (QOS) of the terminal 1 incompliant with IEEE802.11h.
Figure 9A:
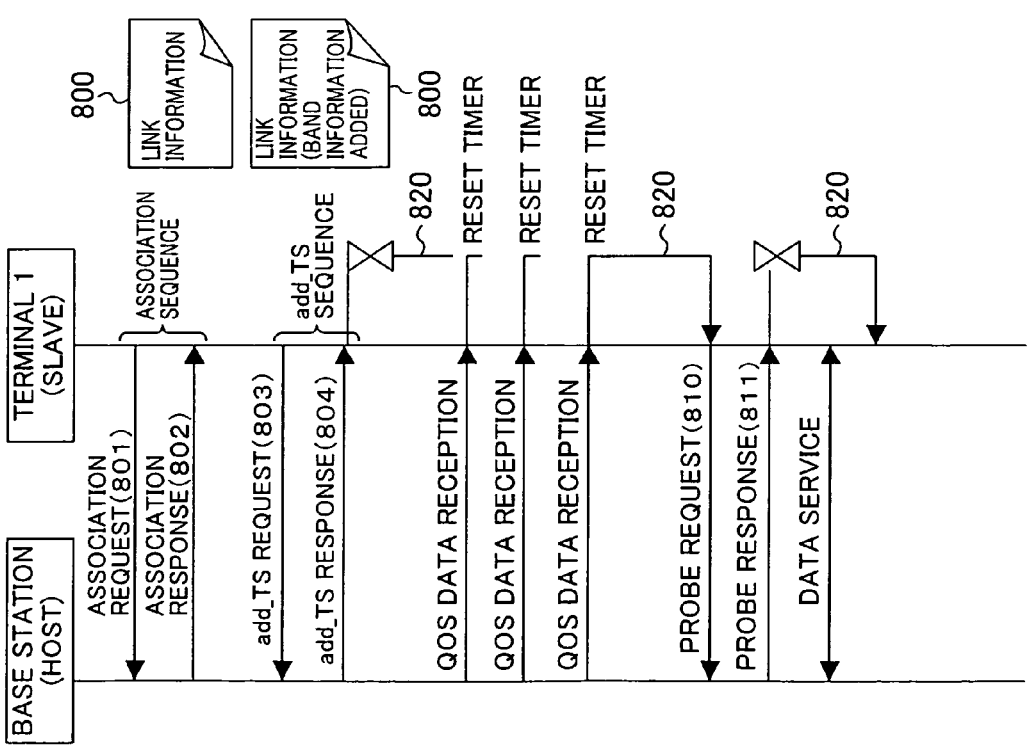
FIG. 9A shows a communication sequence with quality of service (QOS) between the base station and the terminal 1 incompliant with IEEE802.11h.

FIG. 9A shows a communication sequence with quality of service (QOS) between the base station and the terminal 1 incompliant with IEEE802.11h according to embodiment 3 of the present invention. In the example of FIG. 9A, in the first place, an association sequence which is the same as that described in embodiment 1 is carried out. Specifically, the incompliant terminal 1 transmits an association request 801 to the base station and receives an association response 802 from the base station in return, whereby a wireless link is established between these devices. In the meantime, link information 800 about a link with the base station is created in a link information management section of the incompliant terminal 1.

Then, the incompliant terminal 1 transmits an add_TS request (Action) 803 to the base station and receives an add_TS response 804 from the base station in return, whereby a QOS link is established between these devices. In the meantime, link information that a band for association with the base station is reserved is added to the link information 800 managed inside the terminal 1 (i.e., the link information 800 is updated).

After the establishment of the QOS link by reception of the add_TS response 804, the incompliant terminal 1 activates a data reception check timer (data reception state confirmation timer) 820, which is included in the terminal 1, for confirming the presence of the base station in the same channel.

Embodiment 3 is different from embodiment 2 in that embodiment 3 provides quality of service (QOS), and QOS data is periodically received from the base station. When the QOS data (predetermined data) is received from the base station and the association is confirmed, the timer 820 is reset at the time of reception of the QOS data and pauses during reception of the QOS data. When the QOS data is not received from the base station during a predetermined time period, the data reception check timer 820 is activated. If the QOS data is not received during the predetermined time period, the data reception check timer 820 expires, and a probe request 810 is transmitted from the incompliant terminal 1 for association confirmation. If a probe response 811 is received from the base station, the terminal 1 determines that the association is still maintained and activates (starts) the timer 820 again.

FIG. 9B is a flowchart of an operation of the incompliant terminal 1. After the start up, the terminal 1 incompliant with IEEE802.11h performs an association sequence which is the same as that described in embodiments 1 and 2 to attempt to establish an association with the base station (step S1). If the association is successfully established ("Yes" at step S2), the operation proceeds to step S3.

At step S3, an add_TS sequence is performed in which the incompliant terminal 1 acquires quality of service (QOS) for the association with the base station. The add_TS sequence shown in FIG. 9A includes transmission of the add_TS request (Action) 803 from the incompliant terminal 1 and transmission of the add_TS response 804 from the base station. If the quality of service (QOS) is successfully acquired ("Yes" at step S4), the operation proceeds to step S5.

At step S5, the data reception check timer 820 is activated for confirming whether or not the incompliant terminal 1 is normally associated with the base station, and the incompliant terminal 1 enters the normal operation state of step S6. If the QOS data is received from the base station as shown in FIG. 9A, the incompliant terminal 1 determines that the association state is confirmed to be normal (step S7). Then, the incompliant terminal 1 resets and stops the data reception check timer 820 (step S8). The operation returns to step S5 to restart the data reception check timer 820. The loop from step S5 to step S8 is repeated every time the QOS data is received from the base station. When the add_TS data is not received from the base station, the operation of the data reception check timer 820 is started. If it is determined at step S9 that the preset time has expired, a probe request 810 is transmitted from the incompliant terminal 1 to the base station for confirmation of association (step S10).

Subsequent steps S11 to S14 are the same as steps S7 to S10 of FIG. 8B of embodiment 3. If the incompliant terminal 1 receives a probe response 811 from the base station in return for the probe request 810 ("Yes" at step S11), the operation returns to step S5, i.e., the step of activating the data reception check timer 820. If no response is received ("No" at step S11), the incompliant terminal 1 repeats the operation of switching the channel and transmitting the probe request 810 till the base station is found.

With the above structure, a case where data is not received for a preset time period is considered, whereby the presence of the base station can be confirmed more efficiently.

Now, details for the timer setting are described with reference to FIG. 10A wherein the incompliant terminal 1 sets the timer every time the incompliant terminal 1 receives any data, such as normal data, QOS data, or the like.

Figure 10B:
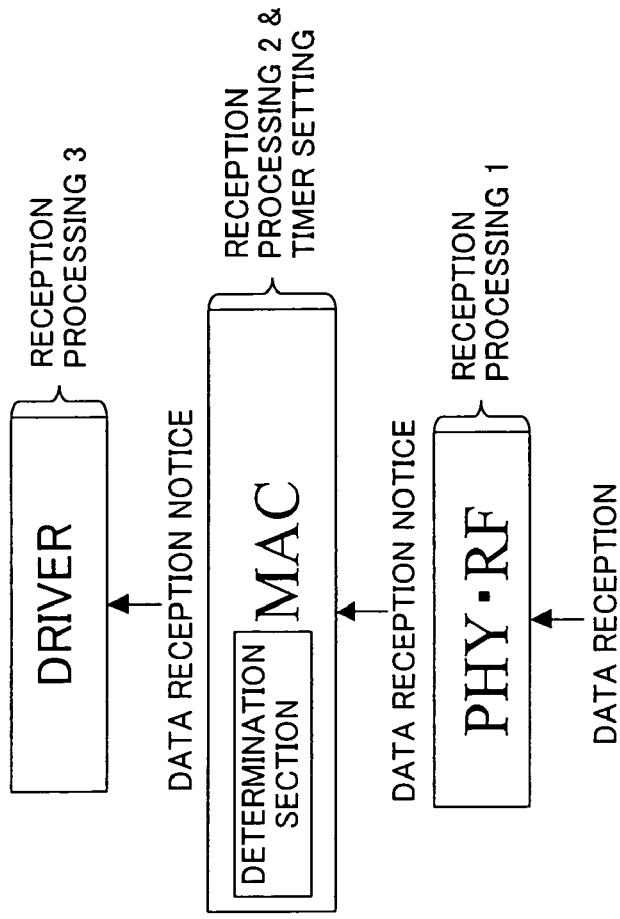
FIG. 10B shows a system of a MAC section for resetting or starting a timer.
Figure 10A:
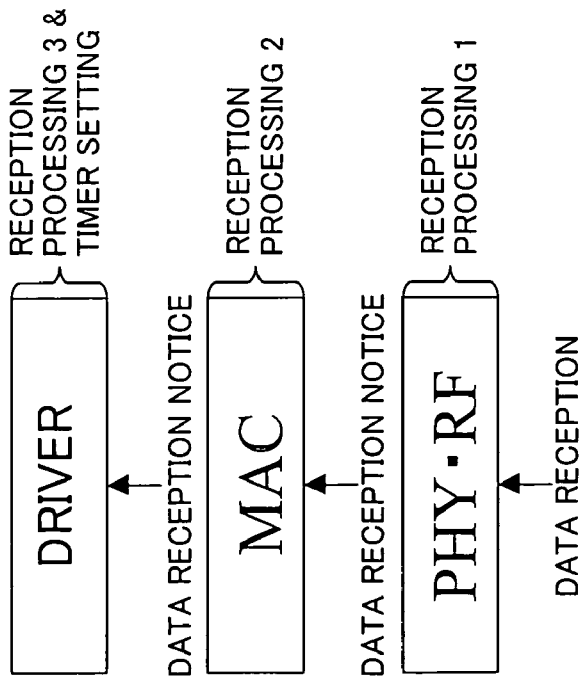
FIG. 10A shows a system of driver soft for resetting or starting a timer.

FIG. 10A shows a system which includes a PHY-RF section for signal conversion between analog and digital signals, a MAC section for performing MAC header analysis and other reception processes, and a driver section for sending a notice and/or reception data to a higher-level application section (not shown). In the system of FIG. 10A, the driver section includes the data reception check timer 820 as driver software in the driver section and performs the above-described timer setting process.

In the system having such a structure, reception processing is performed wherein data is received from the PHY-RF section, and a MAC header is deleted in the MAC section.

The MAC section sends a data reception notice to the driver section. In response to the data reception notice, the driver section resets and starts the data reception check timer 820. In this way, a data reception check timer function can readily be added by providing a reception timer function to the driver section.

FIG. 10B shows an alternative system which also includes a PHY-RF section, a MAC section, and a driver section. However, the system of FIG. 10B is different from that of FIG. 10A in that the MAC section includes a determination section in the form of hardware for performing a data reception check timer process. With this structure, the burden of the data reception check timer process on the host is reduced, whereby a delay time from a reception notice is shortened, and as a result, the timer correctly operates. In the system of FIG. 10A, the delay time from reception of data to setting of the data reception check timer 820 (i.e., the time interval between reception of data and setting of the data reception check timer 820) is:

(Reception processing 1 of PHY-RF section)+
(Reception processing 2 of MAC section)+
(Reception processing 3 of driver section)), whereas in the system of FIG. 10B, the delay time is shortened to:

(Reception processing 1 of PHY-RF section)+
(Reception processing 2 of MAC section).

In this way, the data reception check timer function can be incorporated in hardware.

Embodiment 4

Figure 11:
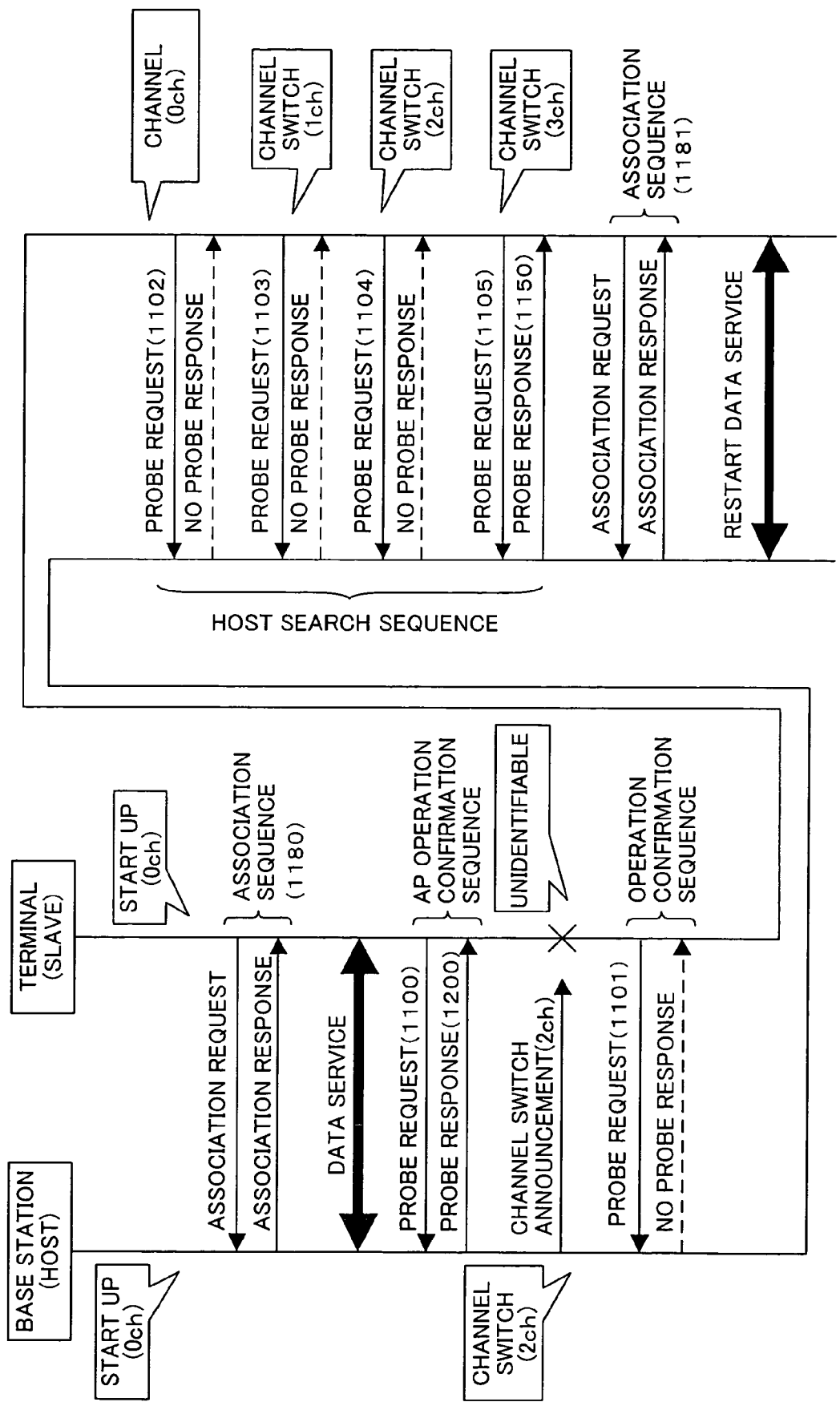
FIG. 11 shows a communication sequence between a base station and a terminal (slave device) incompliant with IEEE802.11h according to embodiment 4 of the present invention.

Next, a base station search sequence according to embodiment 4 of the present invention is shown in FIG. 11. The base station search sequence of FIG. 11 is performed when a terminal 1 which is incompliant with IEEE802.11h and has a quality of service (QOS) acquired from the base station cannot identify a base station, i.e., when the base station has switched the channel and the incompliant terminal receives no probe response from the base station in response to a probe request.

In FIG. 11, transmission of a probe request 1100 from the incompliant terminal, reception of a probe response 1200 from the base station, and the AP operation confirmation sequence for operation confirmation of access points are performed in the same way as described in embodiments 1 to 3, and therefore, the descriptions thereof are herein omitted. In embodiment 4, the description is started with transmission of a channel switch announcement (2ch) from the base station.

As shown in FIG. 11, even if the terminal 1 incompliant with IEEE802.11h standard receives a switch announcement (2ch) from the base station, the terminal 1 cannot identify the announcement. Thus, the association between the base station and the incompliant terminal is canceled. The base station does not send a probe response in response to a probe request 1101 subsequently transmitted from the incompliant terminal 1.

Then, the incompliant terminal starts a host device search sequence. Specifically, referring to FIG. 11, the incompliant terminal 1 transmits probe requests 1102 to 1105 subsequently from channel 0 and continues the search till the terminal 1 receives a probe response of the base station. In the example of FIG. 11, the terminal 1 receives a probe response 1150 issued in response to the probe request 1105 for Channel 3, thereby confirming that the base station exists in Channel 3. Thus, an association sequence 1181 is performed with Channel 3 for which the probe response 1150 is received, whereby an association is established again.

Figure 12:
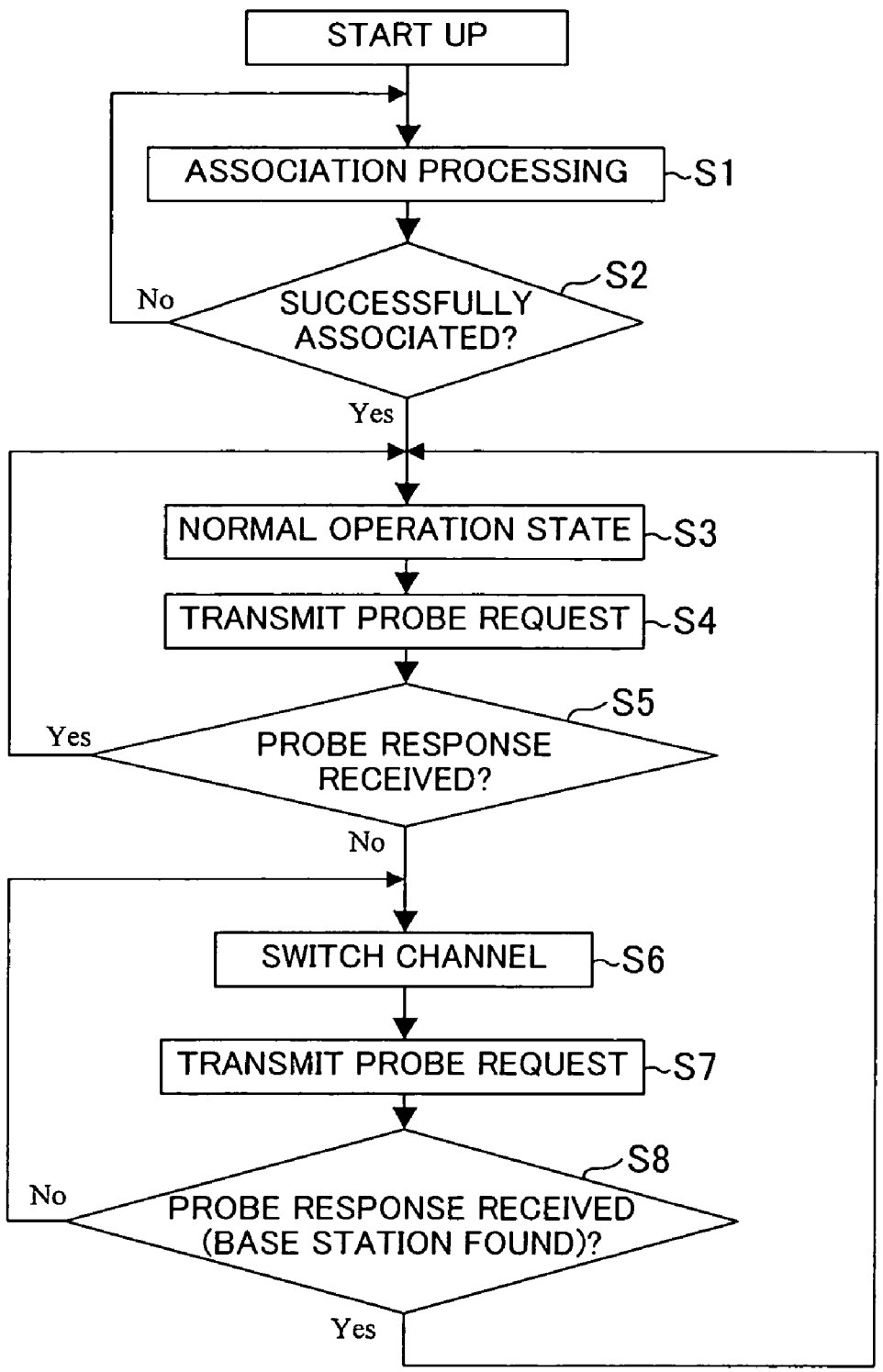
FIG. 12 is a flowchart of an operation of the terminal (slave device) incompliant with IEEE802.11h according to embodiment 4 of the present invention.

FIG. 12 is a flowchart of an operation of the incompliant terminal 1 according to embodiment 4.

The process of FIG. 12 up to step S5 is the same as the operation flow of steps S1 to S5 shown in FIG. 5B of embodiment 1, and therefore, the descriptions thereof are herein omitted. The operation of FIG. 12 of embodiment 4 is different from that of FIG. 5B in that the base station-unidentified processing of step S6 of FIG. 5B is replaced by steps S6 to S8 of FIG. 12. Specifically, at step S5 of FIG. 12, it is determined whether or not a probe response is received from the base station. If not received ("Yes" at step S5), the incompliant terminal 1 switches the channel at step S6. Then, the terminal 1 transmits a probe request at step S7 and confirms whether or not a probe response has been received from the base station at step S8. The process from step S6 to step S8 is repeated while sequentially switching the channel till a probe response is received, i.e., the base station is found. It should be noted that the process of step S6 to step S8 corresponds to the above-described host device search sequence of FIG. 12.

FIG. 13 shows the channel status managed by the incompliant terminal 1 in a memory space. In each of FIGS. 13A to 13E, the upper row shows the channel number, and the lower row shows the statuses of respective channels. In embodiment 4, the channel number includes 0 to 14 (15 channels in total), and the channel number of each channel is stored together with the status of the channel. The values of "0" to "3" of the channel status indicate the following four statuses:

0: not searched, 1: vacant, 2: unrelated base station,
3: related base station (Herein, "related base station" means a base station belonging to the same network, and "unrelated base station" means a base station belonging to a different network.)

FIG. 13A shows the initial state where the terminal 1 is associated with the base station through Channel_0. The status value for Channel_0 is "3" which indicates that the terminal 1 is associated with the related base station. As for the channels other than Channel_0, the status values are all "0" which indicates that the channel has not been searched.

As described above with FIGS. 11 and 12, if the incompliant terminal 1 receives no response from the base station, the terminal 1 performs the base station search sequence. Results of sequential search from Channel_0 are shown in FIGS. 13B through 13E. In FIG. 13B, since the terminal 1 receives no response in Channel_0, the status value is "1" indicative of the vacant state. The search result of Channel_1 is shown in FIG. 13C, and the search result of Channel_2 is shown in FIG. 13D. As seen from FIGS. 13C and 13D, the base station does not exist in Channel_1 or Channel_2. However, in the search of Channel_3, the terminal 1 receives a response from the base station, and the status value "3" indicative of the related host device is shown in FIG. 13E.

In this way, the channel for transmission of the probe request is switched to sequentially search the channel till the terminal 1 receives a probe response from the base station, whereby the terminal 1 finds the base station which has moved to another channel to establish an association with the base station again.

Embodiment 5

Next, an example of a channel search process using a search algorithm according to embodiment 5 of the present invention is described with reference to FIG. 14.

According to the search algorithm of embodiment 5, a channel which is furthest from an unrelated base station(s) is searched by priority. The reason for using this search algorithm is that neighboring channels interfere with each other due to the characteristics of radio waves, and a normal communication is impeded in some cases. Thus, the channel of the base station needs to be switched to a channel which is as far as possible from a channel used by an unrelated base station.

Because of the above reason, the incompliant terminal 1 refers to the previous channel status stored in the memory region (memory space) to search for the related base station through the channel furthest from unrelated base stations by priority. Hereinafter, the algorithm of embodiment 5 is described.

FIGS. 14A through 14F are channel information tables where the upper row shows the channel number, the middle row shows the channel status, and the lower row shows the channel vacancy index. The channel information tables are managed in a memory region (memory space) of the terminal 1. Each information table is managed with the channel statuses of Channel_0 to Channel_14 (15 channels in total) and the channel vacancy index. The channel status is represented by 4 statuses described in embodiment 4 (0: not searched/1: vacant/2: unrelated base station/3: related base station). The channel vacancy index indicates the distance from a channel used by an unrelated base station in the form of a numeric value.

FIG. 14A shows the initial status of the memory region (memory space) managed in the incompliant terminal 1, where the channel status is "not searched (value is 0)" and the channel vacancy index is 0 in all of the channels.

In FIG. 14B, it is assumed that the status of presently-searched Channel_4 is checked, and an unrelated base station is found therein, whereby the channel status of Channel_4 has value "2" which is indicative of an unrelated base station. With the status shown in the information table of FIG. 14B, in order to determine the next channel to be searched, each of the unsearched channels which have status value "0" is calculated as to by how many channels it is distant from the unrelated base station found in Channel_4, whereby the channel vacancy index is updated. In FIG. 14B, the channel vacancy index of Channel_4 is "0", which is the distance from itself, and the channel vacancy index increases by 1 as the distance from Channel_4 increases by 1 channel. Based on this rule, a channel which has the largest channel vacancy index is selected as the next channel to be searched. In this example, Channel_14 which has the largest channel vacancy index, 10, is selected.

Since Channel_14 is selected, the status of searched Channel_14 is checked in FIG. 14C. In this example, it is assumed that an unrelated base station is found in Channel_14, so that the channel status value of Channel_14 is set to 2.

In order to determine the next channel to be searched based on the result of FIG. 14C, each of the unsearched channels (channel status value "0") is calculated as to by how many channels it is distant from the unrelated base stations, whereby the channel vacancy index is updated. Specifically, the channel vacancy index of Channel_4 and Channel_14 is "0", and the distance from these channels is calculated again. Based on the updated information, a channel which has the largest channel vacancy index is selected as the next channel to be searched. In this example, Channel_9 which has the largest channel vacancy index, 5, is selected.

In FIG. 14D, it is assumed that a base station is not found as a result of checking the status of Channel_9, and the channel status value of Channel_9 is set to 1. In FIG. 14E, in order to determine the next channel to be searched based on the result of FIG. 14D, each of the unsearched channels (channel status value "0") is calculated as to by how many channels it is distant from the unrelated base stations, whereby the channel vacancy index is updated. In this example, Channel_0, Channel_13 8 and Channel_10 are distant from the unrelated base stations by 4 channels, and Channel_0 which has the smallest channel number among these channels is selected. It is herein assumed that an unrelated base station is found in Channel_0, and the channel status value of Channel_0 is set to 2.

In order to determine the next channel to be searched based on the result of FIG. 14E, each of the unsearched channels (channel status value "0") is calculated as to by how many channels it is distant from the unrelated base stations, whereby the channel vacancy index is updated. In this example, Channel_8 and Channel_10 are distant from the unrelated base stations by 4 channels, and Channel_8 which has the smallest channel number among these channels is selected.

In FIG. 14F, it is assumed that an unrelated base station is found in searched Channel_8, and the channel status value of Channel_8 is set to 2.

In order to determine the next channel to be searched based on the result of FIG. 14F, each of the unsearched channels (channel status value "0") is calculated as to by how many channels it is distant from the unrelated base stations, whereby the channel vacancy index is updated. As a result of this re-calculation, Channel_11 has the largest channel vacancy index, 3, and is therefore selected as the next channel to be searched.

Thereafter, the unsearched channels of channel status value "0" in the information table are searched in the same manner. The channel search algorithm is ended when the related base station is found. Alternatively, the channel search algorithm is also ended when the information table has no more unsearched channel (channel status value "0").

Figure 15:
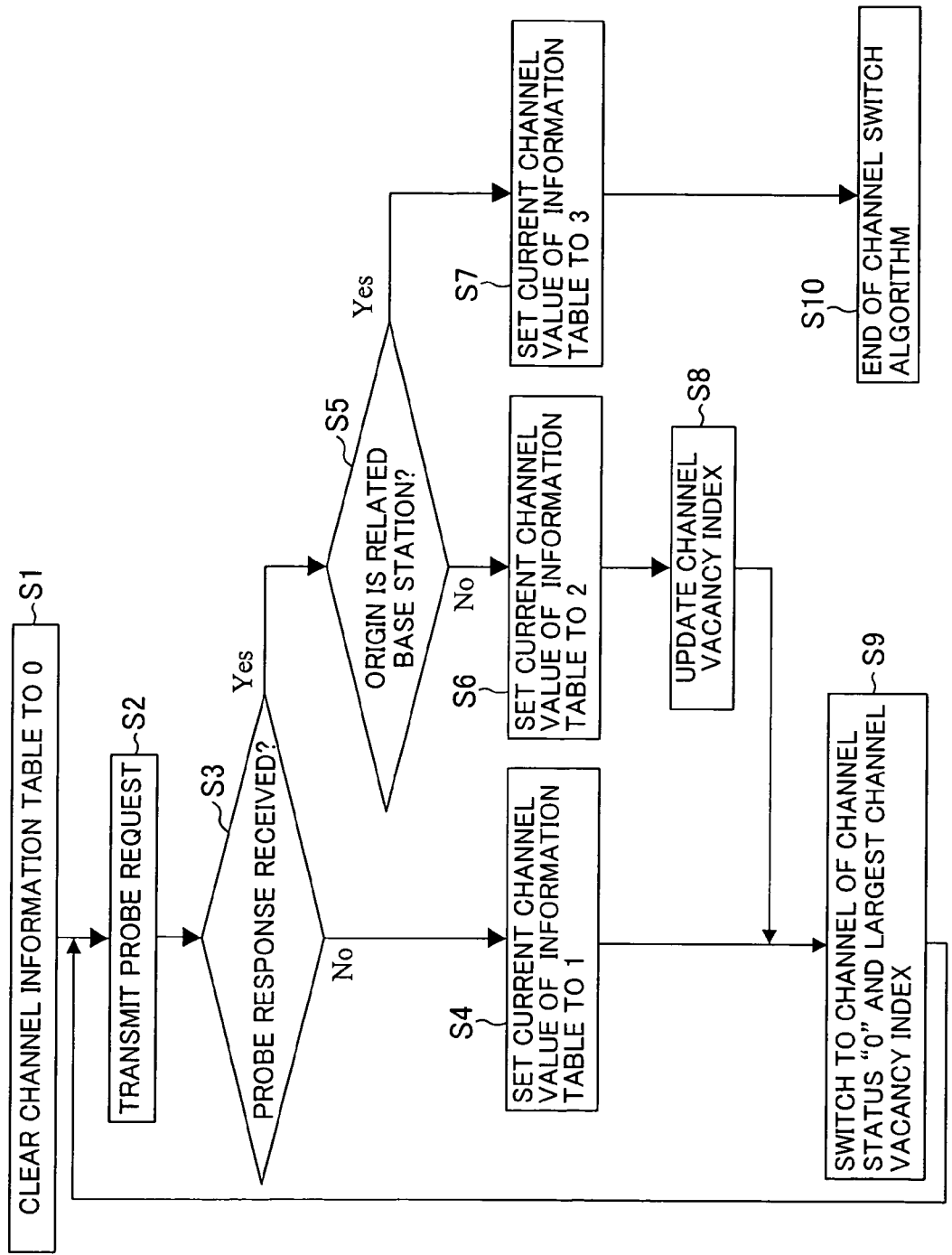
FIG. 15 is a flowchart of a channel search algorithm according to embodiment 5 of the present invention.

FIG. 15 is a flowchart of the channel search algorithm.

In the first place, at step S1, the parameters of the channel information table shown in FIG. 14 are all set to 0, whereby the information of the table is cleared. At step S2, the terminal 1 transmits a probe request to the base station. At step S3, the terminal 1 confirms whether or not a probe response issued in response to the probe request has been received. If not received ("No" at step S3), the status value of the channel information table is set to 1, i.e., the value indicative of vacancy, whereby the vacancy of the channel is recorded. Thereafter, at step S9, the channel is switched to a channel whose channel status is 0 and which has the largest channel vacancy index. Then, the operation returns to step S2, and the above-described process is performed with the switched channel.

At step S3, it is determined whether or not a probe response has been received from the base station. If received ("Yes" at step S3), the operation proceeds to step S5, and the terminal 1 confirms whether or not the origin of the received probe response is the related base station. If the probe response is not from the related base station, the operation proceeds to step S6, and the status value of the current channel in the information table is set to 2, i.e., the value indicative of an unrelated base station.

Subsequently, at step S8, the channel vacancy index is re-calculated. At step S9, the channel to be searched is switched based on the update result to a channel whose channel status is 0 and which has the largest channel vacancy index. Then, the operation returns to step S2, and the above-described process is performed with the switched channel. Thereafter, if it is determined at step S5 that the origin of the received probe response is the related base station, the status value of the current channel in the channel information table is set to 3, i.e., the value indicative of the related base station (step S7). Since the related base station is found, the channel search algorithm is ended.

In the example shown in FIGS. 16A to 16C, it is assumed that there are 15 channels (Channel_0 to Channel_14), and a related base station 1401 operating with Channel_4 is moved to Channel_14 because of interference by an unrelated base station 1410. In FIG. 16A, a terminal 1 and a terminal 2 are associated with the related base station 1401 through Channel_4.

In FIG. 16B, it is assumed that the unrelated base station 1410 is moved into Channel_4 so that the radio wave condition of Channel_4 is deteriorated. The related base station 1401 switches its channel to Channel_14. Accordingly, the terminal 2 which is compliant with IEEE802.11h switches its channel to Channel_14 to maintain the association with the related base station 1401 as shown in FIG. 16C. However, the terminal 1 which is incompliant with IEEE802.11h is left in Channel_4. The terminal 1 needs to perform the channel search process to find the related base station 1401.

FIG. 17 shows an example of the channel search process performed by an incompliant terminal in the example of FIG. 16 where among Channel_0 through Channel_14 a related base station operating with Channel_4 moves its channel to Channel_14 because of interference by an unrelated base station.

Figure 17A:
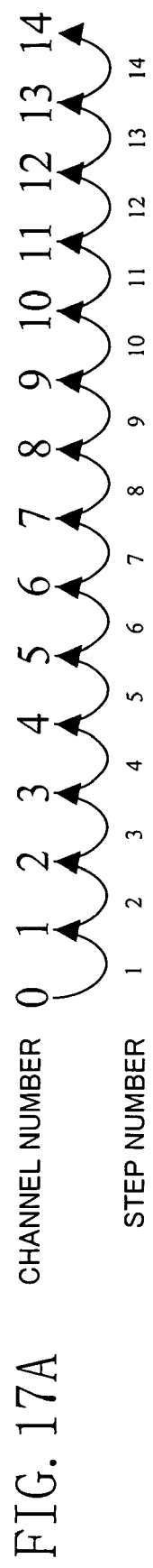
FIG. 17A illustrates the sequential search performed using a commonly-employed search algorithm.
Figure 17B:
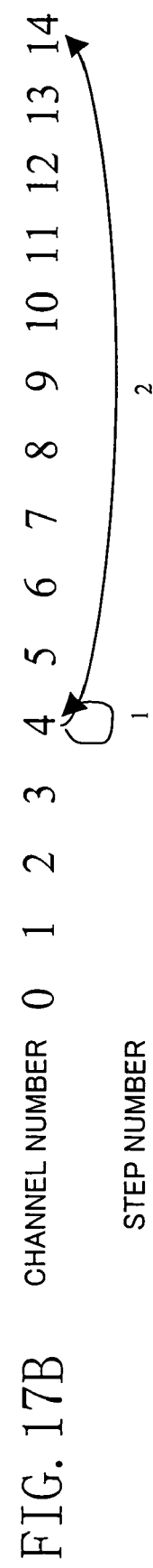
FIG. 17B illustrates an example of the search performed using the search algorithm of embodiment 5 of the present invention.

FIG. 17A shows an example of sequential search. The channels are normally searched from Channel_0 to Channel_14, and therefore, 14 shift steps are required. In comparison, in the case where the channel search algorithm of embodiment 5 shown in FIG. 17B is used, the current channel, Channel_4, is checked, and then, Channel_14 is selected as the channel to be searched as described with reference to FIGS. 14A and 14B. Thus, it is possible to find the related base station 1401 with 2 shift steps.

Since the channel of the base station is switched because of deterioration of the transfer condition which can be caused by a radio wave interference, or the like, the base station is efficiently found using the above-described search algorithm of the present invention wherein a channel to be searched is selected in consideration of the characteristics of radio waves, as compared with the sequential search.

What is claimed is:

1. A wireless device which has a terminal function compliant with IEEE802.11 standard but incompliant with IEEE802.11h standard, the wireless device being included in a wireless network formed by a wireless device having a base station function compliant with IEEE802.11h standard, the terminal wireless device comprising:

a probe request transmission circuit for transmitting a probe request to the base station wireless device, the probe request being used for confirming whether or not the base station wireless device and the incompliant terminal wireless device of the same wireless network exist in the same channel; and a base station presence confirmation circuit for receiving a probe response which is transmitted from the base station wireless device in response to the probe request transmitted by the probe request transmission circuit, thereby confirming the presence of the base station wireless device.

2. The wireless device of claim 1, wherein the probe request transmission circuit has a probe confirmation timer for measuring a time interval for transmission of the probe request.

3. The wireless device of claim 1, wherein:

the probe request transmission circuit has a data reception status confirmation timer;

during a period when the incompliant terminal wireless device receives data from the base station wireless device, the data reception status confirmation timer is reset and stopped; and when reception of the data from the base station wireless device is stopped, the data reception status confirmation timer measures a preset time.

4. The wireless device of claim 3, wherein the timer function of the data reception status confirmation timer is realized in the form of driver software.

5. The wireless device of claim 3, wherein the timer function of the data reception status confirmation timer is realized by hardware.

6. The wireless device of claim 1, wherein when the base station presence confirmation circuit receives no probe response from the base station wireless device, the base station presence confirmation circuit repeats the process of switching the channel and transmitting the probe request through the switched channel till the base station presence confirmation circuit receives the probe response.

7. The wireless device of claim 6, wherein the probe request transmission circuit switches the channel using a channel search algorithm such that a channel which is furthest from a channel including a base station wireless device of a different wireless network is searched by priority.

* * * * *